(12) United States Patent
Sellis et al.

(10) Patent No.: US 10,859,413 B2
(45) Date of Patent: Dec. 8, 2020

(54) PROTECTION SHIELD POSITIONING ASSEMBLY AND POSITIONING DEVICE THEREFORE AND METHOD OF USE

(71) Applicant: Federal-Mogul Powertrain, Inc., Southfield, MI (US)

(72) Inventors: Timothy D. Sellis, West Grove, PA (US); David A. Harris, Coatesville, PA (US); Kenneth C. Upton, Reinholds, PA (US); Danny E. Winters, Downingtown, PA (US); Samuel B. Fryberger, Jr., Spring City, PA (US)

(73) Assignee: Federal-Mogul Powertrain LLC, Southfield, MI (US)

( * ) Notice: Subject to any disclaimer, the term of this patent is extended or adjusted under 35 U.S.C. 154(b) by 822 days.

(21) Appl. No.: 14/847,706

(22) Filed: Sep. 8, 2015

(65) Prior Publication Data

US 2015/0377660 A1    Dec. 31, 2015

Related U.S. Application Data

(60) Division of application No. 13/569,775, filed on Aug. 8, 2012, now Pat. No. 9,157,564, which is a division
(Continued)

(51) Int. Cl.
*H02G 15/04* (2006.01)
*G01D 11/24* (2006.01)
(Continued)

(52) U.S. Cl.
CPC .......... *G01D 11/245* (2013.01); *B60R 16/023* (2013.01); *B60R 16/0222* (2013.01);
(Continued)

(58) Field of Classification Search
USPC .... 174/74 A, 85, 99 R, 82, 87, 93; 411/525, 411/526, 528
See application file for complete search history.

(56) References Cited

U.S. PATENT DOCUMENTS 1,141,484 A    6/1915   Phelps
2,087,384 A    7/1937   Lee
(Continued)

FOREIGN PATENT DOCUMENTS

EP    0432662      6/1991
JP    08029379 A   2/1996
WO    0194838      12/2001

OTHER PUBLICATIONS

Extended European Search Report 08 73 2769 dated Nov. 28, 2012.

*Primary Examiner* — Alfred J Wujciak
(74) *Attorney, Agent, or Firm* — Robert L. Stearns; Dickinson Wright, PLLC

(57) ABSTRACT

A method and assembly for protecting a device connected to a wiring harness is disclosed. The assembly includes a protective tubular shield and a positioning device, with the protective tubular shield having a bore for receiving the device at least partially therein. An elongated wiring harness extends from the device being protected and through the bore of the protective tubular shield. The positioning device is formed having a band and at least one flexible, resilient finger extending radially inwardly from the band. At least one of the fingers forcibly engages the wiring harness to releasably maintain the positioning device and the protective tubular shield in a protection position along the wiring harness at least partially surrounding the device being protected.

18 Claims, 5 Drawing Sheets

Related U.S. Application Data of application No. 11/691,541, filed on Mar. 27, 2007, now Pat. No. 8,263,866, which is a continuation-in-part of application No. 10/942,651, filed on Sep. 16, 2004, now abandoned.

(51) Int. Cl.

| | | |
|---|---|---|
| *B60R 16/02* | (2006.01) | |
| *H02G 3/06* | (2006.01) | |
| *F16L 57/04* | (2006.01) | |
| *B60R 16/023* | (2006.01) | |
| *F16L 3/13* | (2006.01) | |
| *H02G 15/013* | (2006.01) | |
| *H02G 3/04* | (2006.01) | |

(52) U.S. Cl.
CPC .............. *F16L 3/13* (2013.01); *F16L 57/04* (2013.01); *H02G 3/0691* (2013.01); *H02G 3/0418* (2013.01); *H02G 3/0468* (2013.01); *H02G 15/013* (2013.01); *H02G 15/04* (2013.01); *H02G 15/043* (2013.01); *Y10T 29/49879* (2015.01)

(56) References Cited

U.S. PATENT DOCUMENTS

| | | | |
|---|---|---|---|
| 2,090,747 A | 8/1937 | Charmoy | |
| 3,019,284 A * | 1/1962 | Matthysse | H01R 4/20 |
| | | | 174/84 C |
| 3,065,292 A * | 11/1962 | Chickvary | H01R 4/20 |
| | | | 174/84 C |
| 3,429,596 A * | 2/1969 | Marshall | F16L 19/086 |
| | | | 285/27 |
| 3,710,003 A | 7/1973 | Channell | |
| 3,934,902 A | 1/1976 | McNamee | |
| 4,214,147 A | 7/1980 | Kraver | |
| 4,457,544 A | 7/1984 | Snow | |
| 4,679,340 A | 7/1987 | Johansson | |
| 4,751,350 A * | 6/1988 | Eaton | H02G 15/043 |
| | | | 174/74 A |
| 4,836,580 A | 6/1989 | Farrell | |
| 5,010,700 A | 4/1991 | Blair | |
| 5,023,402 A | 6/1991 | King et al. | |
| 5,046,766 A | 9/1991 | Lomberty | |
| 5,067,843 A | 11/1991 | Nova | |
| 5,113,037 A | 5/1992 | King et al. | |
| 5,407,236 A | 4/1995 | Schwarz et al. | |
| 5,669,590 A | 9/1997 | Przewodek | |
| 5,701,887 A | 12/1997 | Rustad et al. | |
| 6,025,559 A | 2/2000 | Simmons | |
| 6,199,920 B1 | 3/2001 | Neustadtl | |
| 6,267,871 B1 * | 7/2001 | Weakly | C02F 1/4678 |
| | | | 204/275.1 |
| 6,423,025 B1 | 7/2002 | Buzot | |
| 6,572,577 B1 | 6/2003 | Binner et al. | |
| 6,648,846 B2 | 11/2003 | Binner et al. | |
| 6,673,032 B2 | 1/2004 | Buzot | |
| 6,752,176 B1 | 6/2004 | Price et al. | |
| 6,958,449 B1 | 10/2005 | Ziebart et al. | |
| 7,032,790 B2 | 4/2006 | Williamson et al. | |
| 7,185,923 B2 | 3/2007 | McNeil | |
| 8,263,866 B2 | 9/2012 | Sellis et al. | |
| 2004/0105720 A1 | 6/2004 | Ishikawa et al. | |
| 2005/0285400 A1 * | 12/2005 | Feith | F16L 55/1125 |
| | | | 138/89 |
| 2006/0054763 A1 | 3/2006 | Fryberger, Jr. et al. | |
| 2009/0311456 A1 | 12/2009 | Harris | |

* cited by examiner

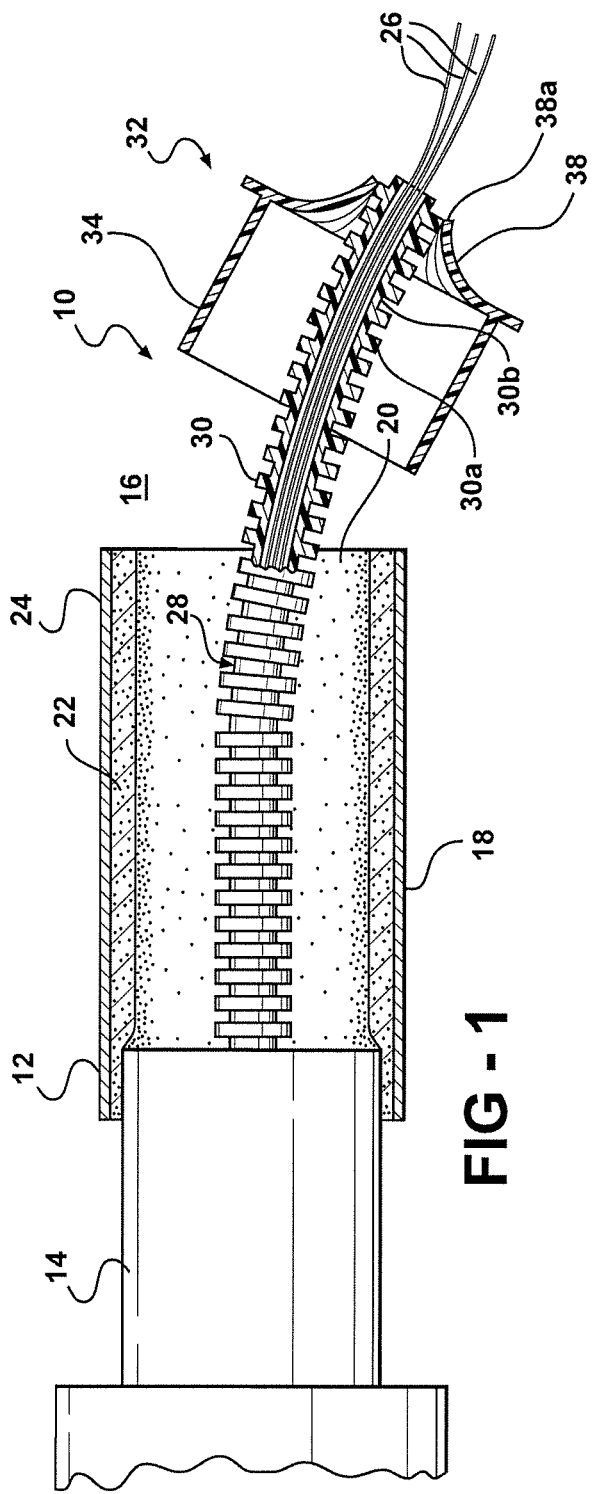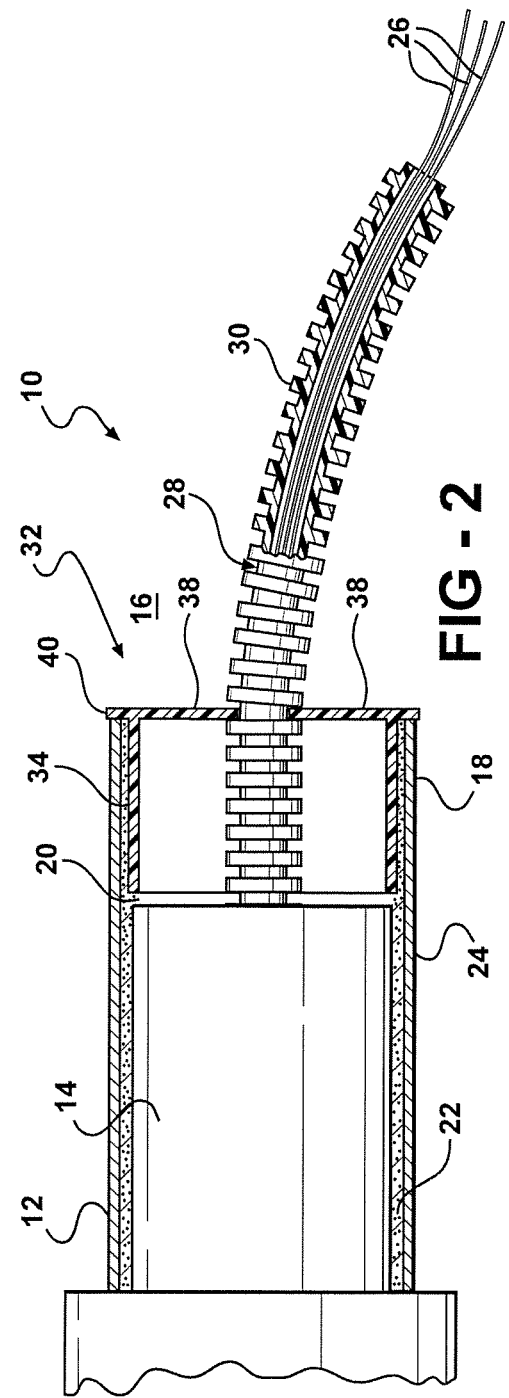

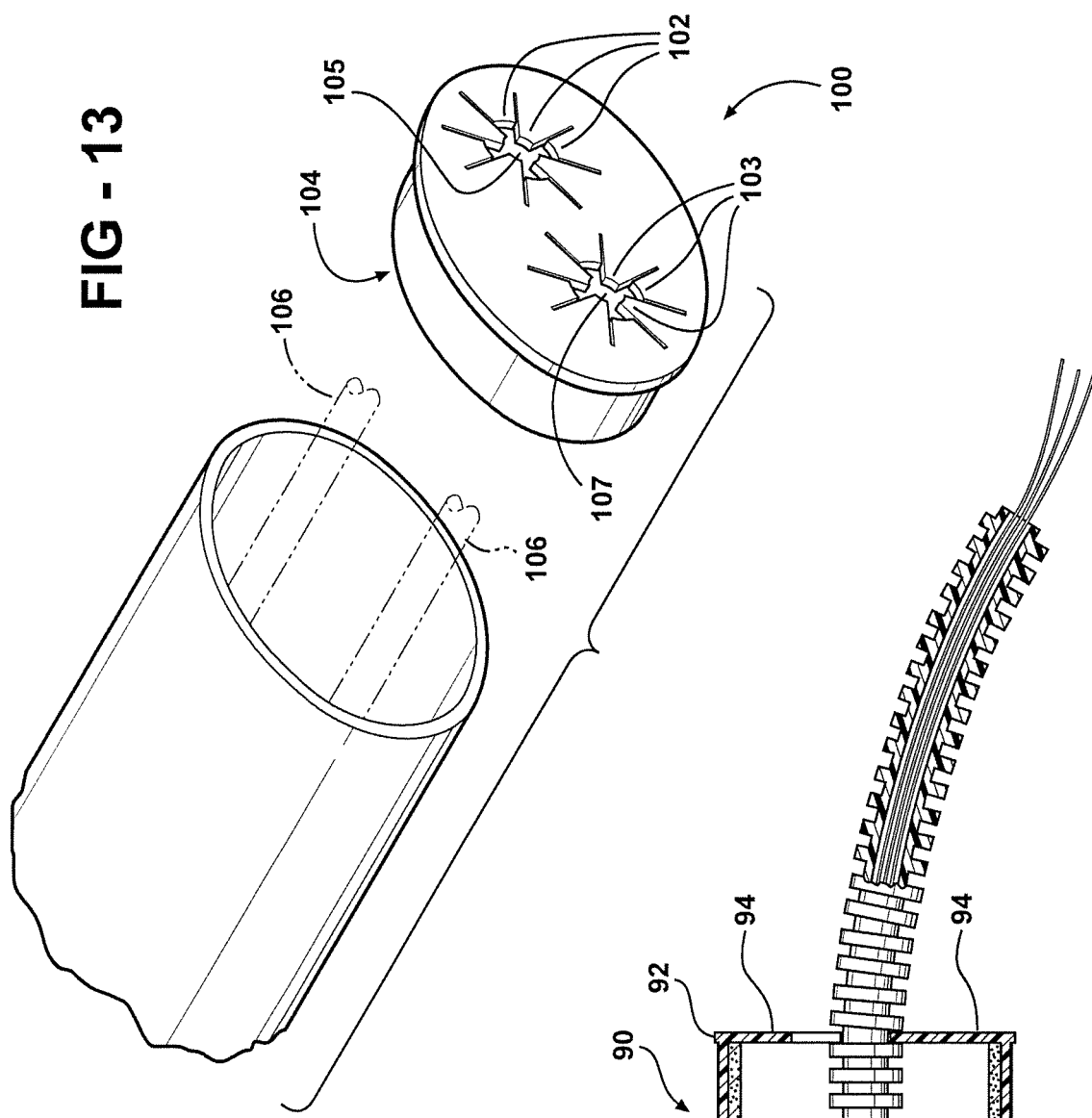

PROTECTION SHIELD POSITIONING ASSEMBLY AND POSITIONING DEVICE THEREFORE AND METHOD OF USE

CROSS-REFERENCE TO CO-PENDING APPLICATION

This application is a divisional application of U.S. application Ser. No. 13/569,775, filed Aug. 8, 2012, which is a divisional application of U.S. application Ser. No. 11/691,541, filed Mar. 27, 2007, now issued as U.S. Pat. No. 8,263,866, which is a continuation-in-part of U.S. application Ser. No. 10/942,651, filed on Sep. 16, 2004, which are all incorporated herein by reference in their entirety.

BACKGROUND OF THE INVENTION

1. Technical Field

This invention concerns a device for positioning and maintaining a protective sleeve or other elongated item at a predetermined position covering a sensor or other object.

2. Related Art

Sensors used in automotive applications, such as oxygen sensors which provide data to control engine operation and performance, are often mounted within the engine compartment of a vehicle where they are subject to a harsh environment including intense radiant heat, sources of abrasion and constant vibration during vehicle operation. In view of the harsh environment, it is advantageous to cover the relatively delicate sensors with protective sleeving which can damp vibration, protect against abrasion and reflect radiant heat. Such sleeves often comprise an elongated tube having an inner damping layer of a non-woven material, for example, polyester felt. The inner damping layer is surrounded by a reflective layer comprising, for example, an aluminum foil layer laminated with a reinforcing layer such as a woven scrim of polymer filaments or a polymer sheet material.

Due to the nature of the protective sleeve and its environment, it is difficult to attach the sleeve to the sensor in a manner which will allow the sleeve to be reliably secured in a desired position and also be readily removable for installation and servicing of the sensor. Adhesives, tape and frictional fits are used to effect attachment, but these methods all suffer various disadvantages. Adhesive attachment to the sensor, while generally secure, permanently attaches the sleeve to the sensor. As a result, this method does not allow for easy removal of the sleeve for servicing of the sensor or reuse of the sleeve. In addition, tape and friction fits can be unreliable and not feasible in view of the heat and vibration encountered by the sensor and its protective sleeve within the engine compartment.

SUMMARY OF THE INVENTION

The invention concerns an assembly for protecting a sensor. The assembly includes a tube extending longitudinally along an axis between opposite open ends and an end cap disposed over one of the open ends. The end cap includes at least one finger that extends radially inward generally toward the axis. The at least one finger is resiliently flexible in opposite axial directions.

In accordance with another aspect of the invention, the end cap can be fastened to the tube.

In accordance with another aspect of the invention, the end cap can be fastened to the tube by a fastener formed as a separate member from that of the tube and end cap.

In accordance with another aspect of the invention, the fastener can be in the form of a staple or an adhesive.

In accordance with another aspect of the invention, the end cap can include a portion that extends into the open end of the tube over which it is disposed.

In accordance with another aspect of the invention, the tube can have an inner layer of vibration dampening material and a separate outer layer of reflective material.

In accordance with another aspect of the invention, the reflective material can be formed from aluminum foil.

In accordance with another aspect of the invention, the open end of the tube opposite the end cap is open and free of an end cap.

In accordance with another aspect of the invention, the end cap can be fabricated of a nonmetallic material.

In accordance with another aspect of the invention, the fingers can be generally triangular.

In accordance with another aspect of the invention, a positioning device for holding a first elongated member in a releasably fixed position along a second elongated member extending through a bore of the first elongated member is provided. The positioning device comprises a band and at least one flexible, resilient finger is attached to the band. Each finger has a first end attached to the band and a second end that extends radially inwardly from the band. At least one of the second ends is engageable with the second elongated member. The band is operably engageable with the first elongated member to hold the first elongated member in the releasably fixed position. The fingers are resiliently deflectable in opposite first and second axial directions to allow the positioning device and the first elongated member to be slid along the second elongated member in the opposite first and second directions In accordance with another aspect of the invention, the band can be generally flat.

In accordance with another aspect of the invention, the band can be elongated.

In accordance with another aspect of the invention, the fingers can be wedge shaped.

In accordance with another aspect of the invention, an assembly for protecting a sensor connected to a wiring harness is provided. The assembly includes a tubular heat shield having a bore for receiving the sensor and an elongated harness sleeve surrounding the wiring harness. The assembly further includes a positioning device for holding the tubular heat shield in a releasably fixed position along the harness sleeve. The positioning device has a band surrounding a space with a plurality of flexible, resilient fingers, each having a first end attached to the band and a second end extending radially inwardly into the space. The second ends of the fingers are engageable with the elongated harness sleeve received within the space. The band and the fingers are slidably movable along the elongated harness sleeve in a first axial direction upon the application of a force to the band directed along the elongated harness sleeve, with the force being sufficient to deflect at least some of the fingers axially in a second axial direction opposite the first axial direction via engagement of the fingers with the elongated harness sleeve, whereupon at least some of the second ends forcibly engage the elongated harness sleeve and hold the positioning device against axial movement relative to the elongated harness sleeve in the absence of the force. The band is operably engageable with the tubular heat shield for holding the tubular heat shield in the releasably fixed position along the elongated harness sleeve. The band and the fingers are slidably movable along the elongated harness sleeve in the second axial direction upon the application of a force to the band directed along the elongated harness sleeve, with the force being sufficient to deflect at least some of the fingers axially in the first axial direction via engagement of the fingers with the elongated harness sleeve to allow removal of the tubular heat shield from the releasably fixed position.

Another aspect of the invention includes a method of shielding a sensor that is operably connected to an elongated wiring harness with a protective positioning device assembly, wherein the protective positioning device assembly includes a tubular sleeve extending between open first and second ends and a positioning device having an annular band and a plurality of flexible, resilient fingers extending radially inwardly from the annular band to free ends. The method includes sliding the tubular protection sleeve along the elongated wiring harness in a first axial direction with the elongated wiring harness extending through the open first and second ends of the tubular protection sleeve and positioning the tubular protection sleeve in a protective position at least partially surrounding the sensor. Further, sliding the positioning device along the elongated wiring harness in the first axial direction and causing at least one of said flexible, resilient fingers to flexibly engage the elongated wiring harness and flex in a second axial direction opposite the first axial direction. Upon sliding the positioning device, at least one of the free ends of the flexible, resilient fingers remain in engagement with the elongated wiring harness and releasably maintain the tubular protection sleeve in the protective position. The positioning device is slidable in the second axial direction to cause at least one of said free ends of the flexible, resilient fingers to flexibly engage the elongated wiring harness and flex in the first axial direction opposite the first axial direction, whereupon the tubular protection sleeve can be slid along the elongated wiring harness in the second axial direction to allow access to the sensor.

BRIEF DESCRIPTION OF THE DRAWINGS

These and other features and advantages of the present invention will become more readily appreciated when considered in connection with the following detailed description of presently preferred embodiments and best mode, appended claims and accompanying drawings, in which:

FIG. 1 is an exploded partial cross-sectional view of an assembly for protecting a sensor according to one presently preferred embodiment of the invention;

FIG. 2 is an assembled partial cross-sectional view of the assembly of FIG. 1;

FIG. 12 is an assembled partial cross-sectional view of another presently preferred embodiment of a positioning device and shield used with the assembly; and FIG. 13 is a perspective view of another presently preferred embodiment of a positioning device used with the assembly.

DETAILED DESCRIPTION OF PREFERRED EMBODIMENTS

Figure 3:
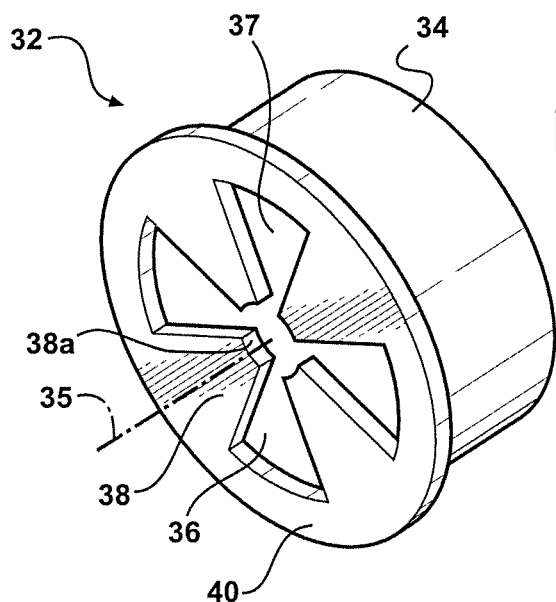
FIG. 3 is a perspective view one presently preferred embodiment of a positioning device used with the assembly.

Referring in more detail to the drawings, FIG. 1 shows an exploded view of a positioning device assembly 10 according to one presently preferred construction used to position and maintain or hold, used synonymously herein, a first elongated member, represented here as an abrasion, acoustic, EMI, or heat or thermal protection shield, for example, and referred to hereafter as a sensor sleeve 12, for example, over a sensor 14 mounted within an engine compartment 16 of a vehicle. In this example, the sensor sleeve 12 comprises an elongated tubular shield, also referred to herein as tube 18, having a bore 20 sized to at least partially receive the sensor 14. The tube 18, by way of example and without limitation, is preferably constructed having a vibration damping layer 22 and an outwardly facing reflective layer 24.

The sensor 14, for example, an oxygen sensor, is connected to a microprocessor (not shown) via a wiring harness 26 through which it provides data used by the microprocessor to control engine operation and performance. Preferably, the wiring harness 26 is covered by a second elongated member, represented here as an elongated protective harness sleeve 28, for example, that extends generally along the length of the wiring harness 26. The harness sleeve 28 can be extruded, molded or otherwise fabricated from any material or fabric, such as a polymeric material, and is represented here, by way of example, as having annular corrugations 30 extending circumferentially about the harness sleeve 28 to provide radial stiffness and bending flexibility thereto.

The positioning device assembly 10 includes the harness sleeve 28 and a positioning device 32, wherein the positioning device 32 engages both the harness sleeve 28 and the sensor sleeve 12. In use, as shown in a comparison of FIGS. 1 and 2, the harness sleeve 28 is received within the bore 20 of the sensor sleeve 12. The sensor sleeve 12 is moved lengthwise along the harness sleeve 28 and positioned surrounding the sensor 14 to provide protection, for example, thermal and other shielding protection to the sensor 14. The positioning device 32, while in engagement with harness sleeve 28, is moved by sliding the positioning device 32 lengthwise along the outer surface of the harness sleeve 28 by application of a sufficient axially directed force. The positioning device 32 is slid into engagement with the sensor sleeve 12, and can be, for example, disposed over an outer surface of, or as shown here, received at least in part within the bore 20 of the sensor sleeve 12. Simultaneous engagement of the positioning device 32 with both the harness and sensor sleeves 28, 12 maintains the sensor sleeve 12 at a predetermined position along the harness sleeve 28 that coincides with it surrounding and protecting the sensor 14 in addition to providing additional protection to the harness sleeve 28. In addition, the positioning device 32 can be further fixed to the sensor sleeve 12, such as by utilizing fasteners, i.e. staples or rivets, adhesives and/or weld joints, for example.

FIGS. 3-11 illustrate positioning devices constructed in accordance with presently preferred embodiments. In one presently preferred embodiment, as shown in FIG. 3, the positioning device 32 is formed of a flexible, resilient material, such as a heat resistant polymer, such as nylon, for example, and comprises a band 34 surrounding a central space 36. The band 34 is elongated along a central axis 35 and has a circular perimeter so that it may readily engage the circular bore 20 of the sensor sleeve 12, as shown in FIG. 2. It should be recognized that the positioning device 32 could be fabricated from any suitable material, including metal and composite materials, for example.

The device 32 as at least one, and shown here as a plurality of flexible, resilient fingers 38 that extend radially inwardly adjacent an end of the band 34 into the central space 36, and shown here, by way of example, as extending toward a central axis 35. The fingers 38, in this embodiment, by way of example only, are wedge or generally pie shaped and positioned in spaced apart relation to one another about the circumference of the band 34 to define wedge shaped spaces 37 therebetween. The wedge shaped spaces 37 in the embodiment illustrated are represented as being similar in size and shape to the wedge shaped fingers 38, though they could be larger or smaller, depending on the desired performance standards for the intended application. Each finger 38 has a free end 38a that preferably has a shape that is substantially complementary to the harness sleeve 28 (see FIGS. 1 and 2) or other elongated items that it will engage. Accordingly, if the harness sleeve 28 is generally circular in cross-section, thereby having a convex outer surface, as shown, then the free ends 38a preferably have a complementary concave surface that defines an arc of a circle substantially similar in diameter as the circular arc defined by the outer surface of the harness sleeve 28. Of course, it should be recognized that the fingers 38 could be provided in any suitable number and could be shaped other than generally pie shaped, such as being rectangular, curvilinear, or otherwise, depending on the application.

The fingers 38 are fixed to the band 34 at ends opposite the free ends 38a in the manner of a cantilever spring. The cantilever action is advantageous because it allows the finger ends 38a to resiliently deflect generally along the central axis 35 of the positioning device 32 to permit the positioning device 32 to be moved axially relative to the harness sleeve 28 along it length. The harness sleeve 28, as illustrated in FIGS. 1 and 2, when used in conjunction with the fingers 38, is particularly advantageous if it has the annular corrugations 30 extending circumferentially about the sleeve 28. The corrugations 30 are formed of alternating circumferentially extending annular crests 30a and circumferentially extending annular channels or troughs 30b to provide a natural engagement and locking feature for the fingers 38 that ensures reliable positioning of the positioning device 32, and yet, allows the positioning device 30 to move easily upon the application of a force on the band 34 in an axial direction along the harness sleeve 28. Such a force, applied to the band 34 with sufficient magnitude, causes the fingers 38 to deflect axially away from the band 34 during assembly, as shown in FIG. 1, in the manner of cantilevers and permit the ends 38a to ride over the crests 30a and snap resiliently between adjacent corrugations 30 and into the troughs 30b (FIG. 2) to establish a new position for the positioning device 32. Of course, for the embodiment shown in FIGS. 1 and 2, the fingers 38 deflect axially inwardly toward the band 34 if the device 32 is being moved from its assembled position toward a disassembled position away from the sensor 14. It is also feasible, in the absence of corrugations 30, to rely on friction between the finger ends 38a and the elongated item that they engage. Furthermore, the elongated item need not be harness sleeve 28, as the fingers 38 might directly engage the wiring harness in the absence of a protective sleeve. For any embodiment, the force applied to move the positioning device 32 must be sufficient to overcome the resistance between the fingers 38 and any elongated component that they engage. The resistance to deflection applied by the fingers 38 can be altered by adjusting the their length, overall size, number and type and/or thickness of material formed from in manufacture.

The positioning device 32 has a rim 40 extending radially outwardly from the band 34. In this example, the rim 40 is positioned at the same end of the band 34 as the fingers 38. The rim 40 acts as a stop when the positioning device 32 is pushed to a fully assembled position relative to the sensor sleeve 12.

Figure 4:
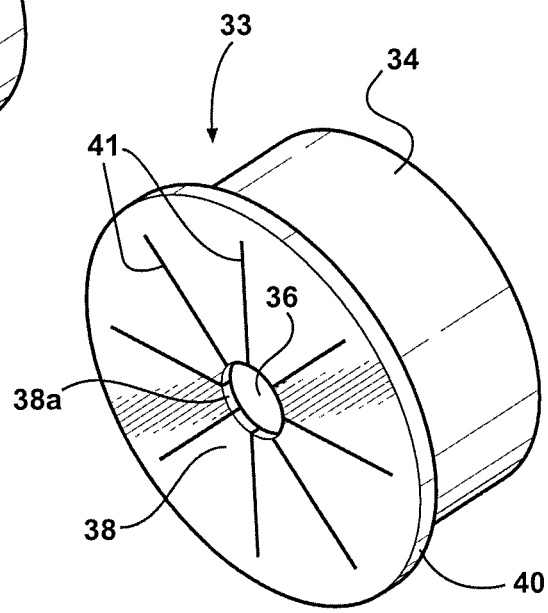
FIG. 4 is a perspective view of another presently preferred embodiment of a positioning device used with the assembly.

FIG. 4 shows an alternate embodiment 33 of the positioning device, substantially similar to device 32 but, wherein the fingers 38 are positioned adjacent to one another, and thus, substantially omits the spaces between the adjacent fingers 38. Instead, the adjacent fingers 38 are spaced circumferentially from one another by slits 41 having a generally uniform width along their length.

Figure 5:
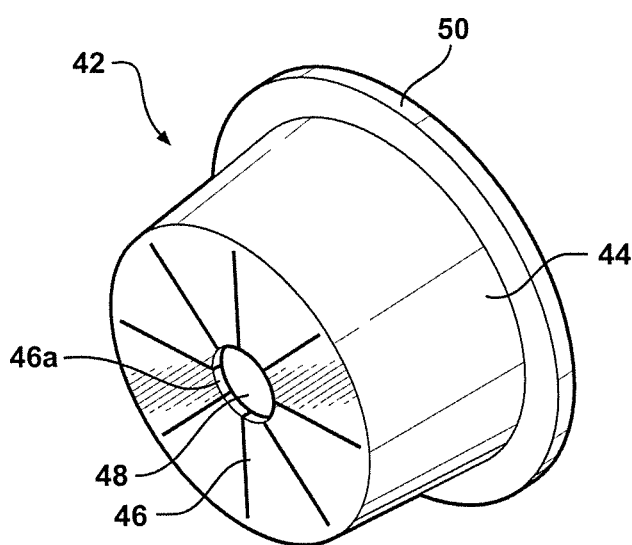
FIG. 5 is a perspective view of another presently preferred embodiment of a positioning device used with the assembly.

FIG. 5 shows another alternate embodiment 42 of the positioning device. The positioning device 42 comprises an elongated, tapered band 44 to which are attached a plurality of fingers 46. The band 44 defines a central space 48 into which the fingers 46 extend. The fingers 46 are arranged circumferentially around the band 44 adjacent to one another (alternately, they may be in spaced apart relation as in the first embodiment above). Preferably, the ends 46a of fingers 46 are shaped (in this case with a circular arc) to accommodate the elongated item that they will engage during use. A rim 50 extends radially outwardly from the band 44, wherein the rim 50 is positioned at an opposite end of band 44 from the fingers 46.

Figure 6:
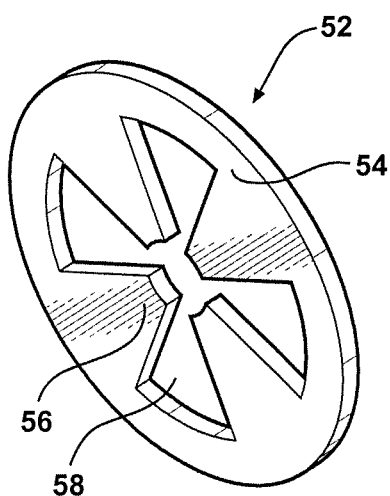
FIG. 6 is a perspective view of another presently preferred embodiment of a positioning device used with the assembly.

FIG. 6 illustrates another alternate embodiment 52 of the positioning device. Again, the device 52 comprises a band 54 to which a plurality of resilient, flexible fingers 56 are attached. The band 54 is not elongated as in the embodiments previously described but, nevertheless, defines a central space 58 into which the fingers 56 extend. The fingers 56, although shown in spaced apart relation to one another, thereby defining wedge shaped spaces as in the first embodiment, could be formed as shown in FIG. 4 adjacent one another.

Figure 7:
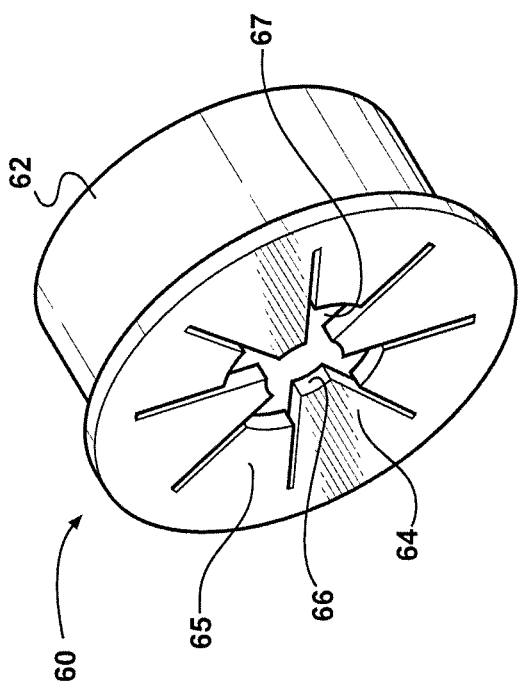
FIG. 7 is a perspective view of another presently preferred embodiment of a positioning device used with the assembly.
Figure 8:
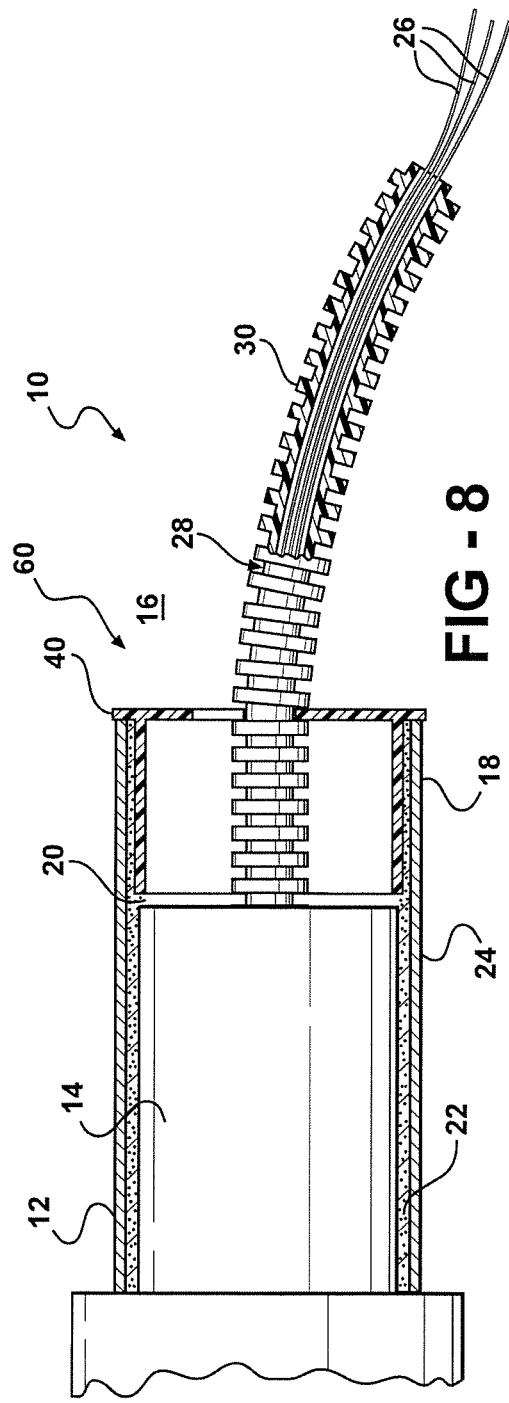
FIG. 8 is an assembled partial cross-sectional view of the device of FIG. 7.

FIG. 7 illustrates another alternate embodiment 60 of the positioning device. This embodiment is similar to the embodiment shown in FIG. 4, wherein the device 60 comprises a band 62 to which a plurality of resilient, flexible full length fingers 64 are attached, however, shorter reduced length partial fingers 65 extend between the full length fingers 64 to define partial wedge shaped spaces 67 between the full length fingers 64 adjacent free ends 66 of the fingers 64. The partial fingers 65 are represented here, by way of example, as being similar in width to the full length fingers 64, however, the widths of the partial fingers 65 could be varied to be wider or narrower than the full length fingers 64, as desired for the intended application.

The truncated partial fingers 65 preferably extend a predetermined length inwardly such that they remain spaced in a slight clearance relative to the harness sleeve 28 received therethrough (FIG. 8), thereby facilitating the ease with which the device 60 can be moved along the length of the associated harness sleeve 28, while still acting to maintain the harness sleeve 28 in a generally concentric relation to the device 60. Accordingly, the harness sleeve 28 is prevented from moving radially between the spaced fingers 64. Although a slight clearance fit may be preferred in some applications, it is contemplated that a line-to-line fit could exist between the shorter fingers 65 and the harness sleeve 28, or other elongate member received therethrough. Otherwise, the device 60 is generally the same as describe above in reference to FIG. 3.

Figure 9:
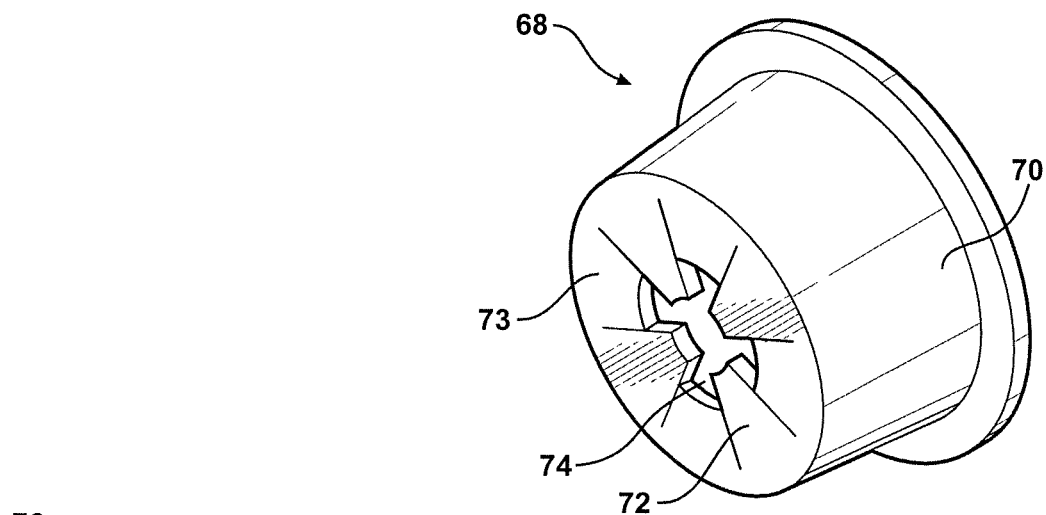
FIG. 9 is a perspective view of another presently preferred embodiment of a positioning device used with the assembly.

FIG. 9 illustrates another alternate embodiment 68 of the positioning device. This embodiment is similar to the embodiment shown in FIG. 5, wherein the device 68 comprises a conically tapered band 70 to which a plurality of resilient, flexible full length fingers 72 are attached. However, the device 68 has shorter reduced length partial fingers 73 extending between the full length fingers 74 to define partial wedge shaped spaces 74 between the full length fingers 72 in the same fashion as described above in relation to FIGS. 7 and 8. Accordingly, given the discussion above in relation to FIGS. 7 and 8, no further discussion is believed necessary.

Figure 10:
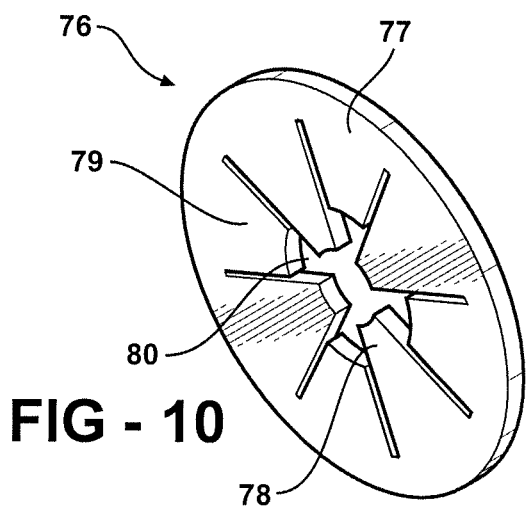
FIG. 10 is a perspective view of another presently preferred embodiment of a positioning device used with the assembly.

FIG. 10 illustrates another alternate embodiment 76 of the positioning device. This embodiment is similar to the embodiment shown in FIG. 6, wherein the device 76 comprises a band 77 that is generally flat, to which a plurality of resilient, flexible full length fingers 78 are attached. However, the device 76 has shorter reduced length partial fingers 79 extending between the full length fingers 78 to define partial wedge shaped spaces 80 between the full length fingers 78 in the same fashion as described above in relation to FIGS. 7-9. Accordingly, given the discussion above in relation to FIGS. 7-9, no further discussion is believed necessary.

Figure 11:
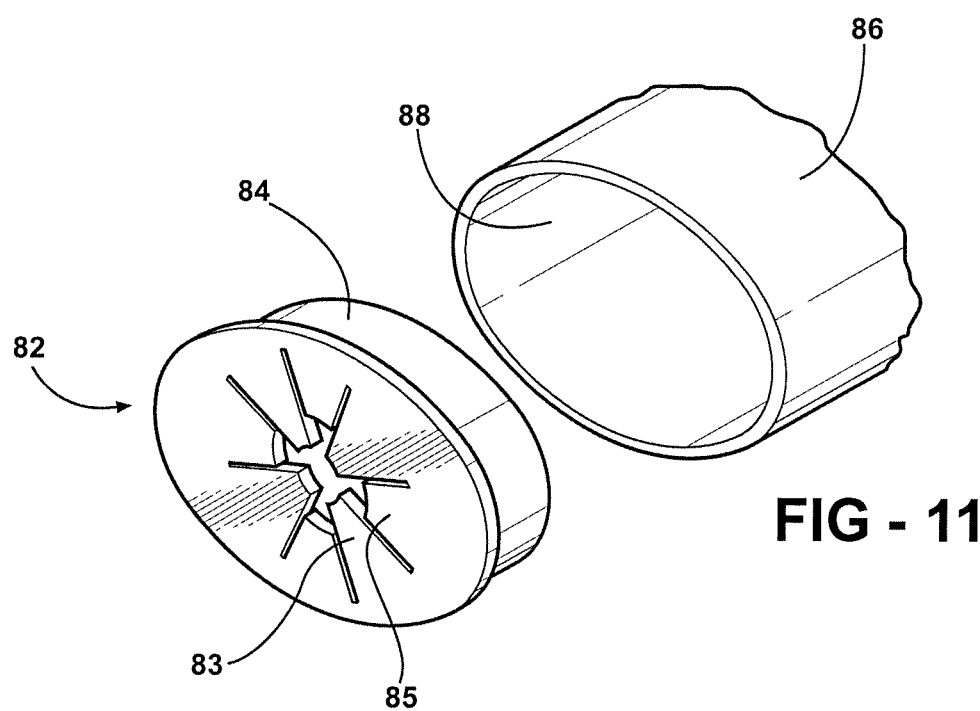
FIG. 11 is a perspective view of yet another presently preferred embodiment of a positioning device used with the assembly.

FIG. 11 illustrates another alternate embodiment 82 of the positioning device. This embodiment can be used in accordance with any of the embodiments discussed above which have an elongate band, and is illustrated here as having full length fingers 83 and partial length fingers 85 in alternating sequence. A band 84 of the device 82 is represented, by way of example, as being generally oval in shape. Accordingly, the band is preferably used in conjunction with a sensor sleeve 86 having an oval bore 88 of complimentary size and shape to an outer surface of the band 84, such that the band 84 can be readily received and attached in the oval bore 88, preferably in a close fit therewith. It should be recognized that although the band 84 is represented as being oval, it could take on any non-circular shape in radial cross-section, as desired, such as square or otherwise.

FIG. 12 illustrates another alternate embodiment 90 of the positioning device. This embodiment is similar to the embodiment shown in FIGS. 1-4, and 7-8, wherein the device 90 comprises a band 92 to which at least one, and shown as a plurality of resilient, flexible fingers 94 are attached, however, the positioning device 90 is formed as one piece of material with a protective sensor sleeve 96. The sensor sleeve 96 can be fabricated having any suitable length and circumferential shape, depending on the application. Further, the sensor sleeve 96 can have an inner protective layer 98 of any suitable material to provide added protection against vibration, abrasion, acoustic, EMI, and/or thermal affects. Otherwise, the positioning device 90 and its associated features function generally the same as discussed above in relation to FIGS. 1-4, and 7-8, and so, no further discussion is necessary.

FIG. 13 illustrates another alternate embodiment 100 of the positioning device. This embodiment can be constructed with at least one, and shown as a plurality of fingers 102, 103 extending radially into a central space 104 of the positioning device 100. Rather than the fingers 102, 103 extending inwardly to form a single opening, as in the previous embodiments, the fingers 102, extend toward one axis to form one opening 105, while the fingers 103 extend inwardly toward a separate axis to form another opening 107 separate from the opening 105. As such, the separate openings 105, 107 allow the positioning device 100 to receive a pair of elongate members therein, such as a pair of separate wire harnesses 106.

Accordingly, in view of the description of the presently preferred embodiments above, it should be recognized that positioning devices constructed in accordance with the invention can be fabricated in a variety of shapes, sizes, and configurations to accommodate many different applications. It should be further understood that the devices can be used in conjunction with a single wire harness, a pair of wire harnesses, or more. If more than two wire harnesses are to be received in the positioning devices, the finger or fingers can be fabricated to project toward as many axes to form as many openings as necessary to accommodate multiple wiring harnesses. It should also be understood that the fingers of the positioning devices can formed having any suitable shape and size, and that they can be provided as full fingers, as in FIGS. 3-6, or have partial fingers, as in FIGS. 7-11.

Positioning devices and positioning assemblies constructed in accordance with the invention provide numerous advantages for securing protective sleeves or other items at a predetermined position along an elongated item, such as a wiring harness, for example. By way of example and without limitation, they securely fasten and/or maintain the protective sleeve at the desired position to protect a component, such as an electrical sensor, and yet, are easily moved along the elongated item to reposition the protective sleeve. This allows the protective sleeve to be quickly removed from the item for component maintenance and then readily repositioned to protect the component without damage to the sleeve, thereby allowing it to be reused. Furthermore, the positioning assembly or device can be part of a sub-assembly that includes the component being protected, the wiring harness, the harness sleeve and the component sleeve. This contributes to a reduction is costs associated with the integration of the sub-assembly into the vehicle, as the steps of assembling the protective sleeve are minimized.

Obviously, in light of the above teachings, many modifications and variations of the present invention are possible. It is, therefore, to be understood that within the scope of the appended claims, the invention may be practiced otherwise than as specifically described.

What is claimed is:

1. An assembly for protecting a sensor, comprising:
a tube extending longitudinally along an axis between opposite open ends; and
an end cap disposed over one of said open ends, said end cap including at least one finger that extends radially inward generally toward said axis; said at least one finger being resiliently flexible in opposite axial directions.

2. The assembly of claim 1, wherein the end cap is fastened to the tube.

3. The assembly of claim 2, wherein said end cap is fastened to the tube by a fastener formed as a separate piece from that of said tube and end cap.

4. The assembly of claim 3, wherein said fastener is in the form of a staple or an adhesive.

5. The assembly of claim 1 wherein the end cap includes a portion that extends into said open end of said tube over which it is disposed.

6. The assembly of claim 1 wherein said tube has an inner layer of vibration dampening material and a separate outer layer of reflective material.

7. The assembly of claim 6 wherein the reflective material is aluminum foil.

8. The assembly of claim 1 wherein said open end of said tube opposite said end cap is open and free of an end cap.

9. The assembly of claim 1 wherein said end cap is fabricated of a nonmetallic material.

10. The assembly of claim 9 wherein said nonmetallic material is nylon.

11. The assembly of claim 1 wherein there are a plurality of said fingers arranged radially adjacent one another.

12. The assembly of claim 1 wherein said end cap includes an outer band of end cap material from which said at least one finger extends radially inward.

13. The assembly of claim 1 wherein said at least one finger has one of a wedge shape, pie shape, rectangular shape, curvilinear shape, frustroconical shape, and polygonal shape.

14. The assembly of claim 1, wherein the end cap is generally flat.

15. The assembly of claim 14, wherein there are a plurality of said fingers.

16. The assembly of claim 1, wherein the tube has a through bore extending longitudinally along said axis between said opposite open ends.

17. The assembly of claim 1, wherein said at least one finger extends generally perpendicularly to said axis.

18. The assembly of claim 1, wherein said at least one finger includes a plurality of fingers extending in generally coplanar relation with one another.

* * * * *